United States Patent [19]

Moscovitch

[11] Patent Number: 5,065,031
[45] Date of Patent: Nov. 12, 1991

[54] PERSONNEL TL DOSIMETRY METHOD AND APPARATUS FOR DETERMINATION OF RISK RELATED QUANTITY

[75] Inventor: Marko Moscovitch, South Euclid, Ohio

[73] Assignee: The Harshaw Chemical Company, Cleveland, Ohio

[21] Appl. No.: 579,846

[22] Filed: Sep. 10, 1990

Related U.S. Application Data

[63] Continuation of Ser. No. 216,343, Jul. 7, 1988, abandoned.

[51] Int. Cl.$^5$ .............................................. G01T 1/11
[52] U.S. Cl. .............................. 250/486.1; 250/484.1; 250/482.1
[58] Field of Search ............... 250/482.1, 484.1, 486.1, 250/390.03

[56] References Cited

U.S. PATENT DOCUMENTS

| | | | |
|---|---|---|---|
| 4,465,936 | 8/1984 | Ishiguro et al. | 250/486.1 X |
| 4,638,163 | 1/1987 | Braunlich et al. | 250/337 |
| 4,804,847 | 2/1989 | Uber, III | 250/389 |

OTHER PUBLICATIONS

Storm et al., "The Los Alamos Thermoluminescence Dosemeter Badge", Radiation Protection Dosimetry, vol. 1, No. 3, pp. 209-219 (1982).
Horowitz et al., "Incorporation of Monte Carlo Electron Interface Studies Into Photon General Cavity Theory", Radiation Protection Dosimetry, vol. 7, pp. 437-441, 1986.
Soares et al., "Difficulties Encountered with Some Intermediate-Atomic-Number Radiation-Protection Dosimeters Irradiated On-Phantom in Low-Energy Photon Beams", Health Physics, vol. 54, No. 4, pp. 431-444.
Plato et al., "Production of Element Correction Factors for Thermoluminescent Dosimeters", Health Physics, vol. 49, No. 5, pp. 873-881 (1985).
Plato et al., "Two Methods for Examining Angular Response of Personnel Dosimeters", Health Physics, vol. 54, No. 6, pp. 597-606 (1988).
Colvett et al., "TVA's Dose Algorithm for Panasonic Type 802 TLD's", Radiation Protection Management, vol. 5, No. 5 (Sep./Oct. 1988), pp. 49-62.

Primary Examiner—Constantine Hannaher
Assistant Examiner—Jacob Eisenberg
Attorney, Agent, or Firm—Renner, Otto, Boisselle & Sklar

[57] ABSTRACT

A personnel dosimetry method and system wherein the identity of a radiation field mixture is determined by using the correlation between two ratios of the responses of two pairs of three TL elements that are filtered to respond differently to the mixed radiation field. Also described is a calibration methodology which links the response of a dosimeter to a variety of different radiation fields calibrated by a standardization agency to the response of the dosimeter to a local and uncalibrated reference source by definition of a local reference of generic unit.

22 Claims, 7 Drawing Sheets

PERSONNEL TL DOSIMETRY METHOD AND APPARATUS FOR DETERMINATION OF RISK RELATED QUANTITY

This is a continuation of application Ser. No. 216,343, filed on July 7, 1988, now abandoned.

The invention herein described relates generally to thermoluminescence dosimetry and, more particularly, to a method and apparatus for accurate dose equivalent determination and radiation field mixture identification.

BACKGROUND OF THE INVENTION

Although the need for improving the quality of personnel dosimetry systems is well recognized by the health physics community members and by various authorities, there is no overall agreement on techniques and methodology which are required to achieve this goal. Some of the inconsistencies between the various dosimetry programs and systems have been recently demonstrated in a pilot performance test conducted by the Department of Energy Laboratory Accreditation Program (DOELAP) where as a group, the participants met the test criteria in only 38% of the categories. The results of this study show large variations in the reported dose by different dosimeter types which were exposed to identical radiation fields and dose levels. The participants all experienced difficulties in the categories that involve low energy photons or mixtures of low energy photons and beta rays. The main reasons for the large variations in the test results and poor performance in some of the test categories that were identified are: (1) lack of evaluation and preparation of the system, (2) calibration problems, and (3) dose calculation algorithms and dosimeters not able to accommodate a wide range of radiation types and energies. The design and response characteristics of the dosimeter coupled with the dose calculation algorithms which translate the dosimeter response to risk related quantity (dose equivalent) are among the most important factors which affect overall performance of a dosimetry system.

SUMMARY OF THE INVENTION

The present invention provides an improved multi-element TL dosimeter together with dose calculation algorithms which are designed to enable users to meet the ever growing demands of modern personnel dosimetry. The methodology of the invention provides for improved interpretation of dosimeter response in terms of risk related quantity, i.e., dose equivalent. The dosimeter and dose calculation algorithms enable the system (a personnel dosimetry system in particular) to accommodate a wide range of radiation types and energies.

More particularly, the dosimeter includes multiple thermoluminescence (TL) elements and associated tissue equivalent filters. In accordance with the preferred methodology of the invention, there are three TL elements and filters which function as a basis for shallow dose estimation, a basis for deep dose estimation and as an energy spectrometer for low level energy photons, respectively. The dosimeter may include one or more other TL elements and associated filters for other purposes not germane to the present invention.

Further in accordance with the invention, dosimeter response can be used to identify the radiation field mixture and to determine the relative contribution of each component in the mixed radiation field. This is accomplished by the use of mixture identification formulas that are based on superposition of radiation fields and the algorithmization of the response correlation between two pairs of TL element response ratios. Mixture identification curves are obtained and these are very different for various radiation field mixtures and compositions, thereby enabling identification of mixture type and component contribution.

Also provided is a calibration methodology which links the response of the dosimeter to a variety of different radiation fields calibrated by the National Bureau of Standards or like standardization agency to the response of the dosimeter to a local and uncalibrated reference source. This involves definition of a local reference or generic unit.

The invention also provides a dose computation formalism based on the superposition of radiation fields and the calibration parameters obtained from the calibration methodology.

The foregoing and other features of the invention are hereinafter fully described, the following description and the annexed drawings setting forth in detail a certain illustrative embodiment of the invention, this being indicative, however, of but one of the ways in which the principles of the invention may be employed.

BRIEF DESCRIPTION OF THE DRAWINGS

In the annexed drawings.

DETAILED DESCRIPTION

Figure 1:
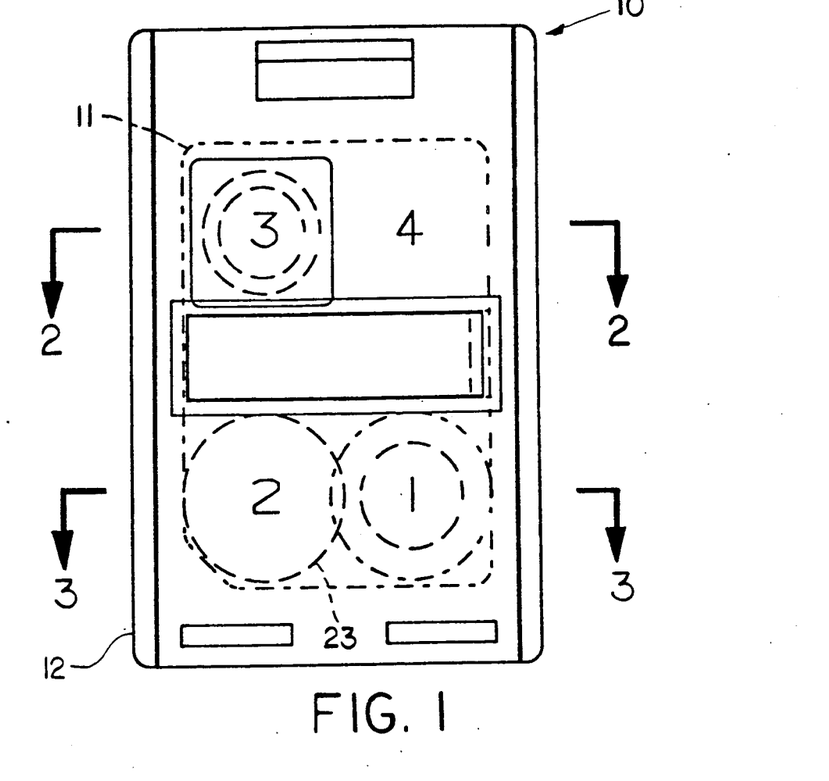
FIG. 1 is a plan view of a personnel beta-gamma dosimeter having preferred usage in the practice of the invention.
Figure 2:
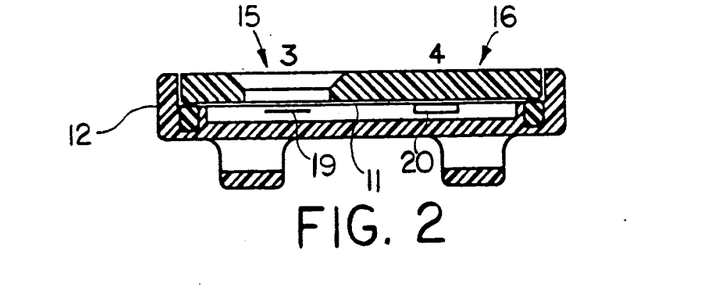
FIG. 2 is a sectional view of the dosimeter taken along the line 2—2 of FIG. 1.
Figure 3:
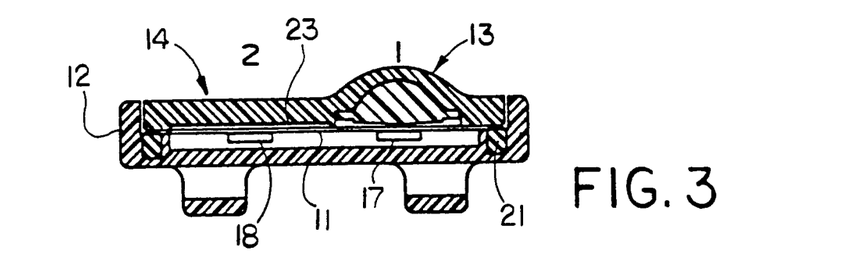
FIG. 3 is a sectional view of the dosimeter taken along the line 3—3 of FIG. 1.

In FIGS. 1—3, the dosimeter 10 can be seen to be principally composed of two parts, a thermoluminescence dosimetry (TLD) card 11 and a holder 12 which carries radiation modifying filters 13-16. The TLD card 11 consists of four LiF:Mg,Ti thermoluminescence (TL) elements 17-20 of different thicknesses and compositions mounted in known manner between two Teflon (PTFE) sheets on an aluminum substrate. Each TL element is covered by its own unique filter which provides different radiation absorption thicknesses to allow dose estimation for various organs in risk. The TL elements 17-20 are located in positions designated 1-4, respectively, and the card 11 may be sealed in the holder 12 by annular seal 21.

In the illustrated preferred dosimeter, TL element 19 in position 3 is a thin solid TLD-700 phosphor (Lithium-7 enriched fluoride) having a preferred thickness of 0.09 mm. This element is protected from the environment by filter 15 which is a thin aluminized Mylar sheet having a preferred thickness of 0.0025 inch and a tissue equivalency of 7.5 mg/cm$^2$. The thin aluminized Mylar sheet corresponds to an open window in the holder. The response of element 19 provides a basis for shallow dose estimation. As a result of its small thickness (a factor of 10 thinner than a heretofore standard 3 mm by 3 mm by 0.9 mm TLD ribbon), underestimation of shallow dose contribution of low energy beta rays is reduced. The small thickness of both the element (substantially less than 0.9 mm) and filter (substantially less than 0.9 mm) provide for reduced energy dependent response to low energy beta particles.

TL elements 17 and 18 in positions 1 and 2 each are a thicker TLD-700 phosphor having a preferred thickness of 0.4 mm. Element 17 is covered by filter 13 to provide a basis for deep dose estimation. The filter 13 has a density thickness substantially greater than 250 mg/cm$^2$ and preferably 1000 cm$^2$ to minimize the contribution of high energy beta rays (Sr/Y-90) to the deep dose response and to provide tissue equivalent absorption thickness as close as possible to the actual depth in tissue where deep dose estimation is desired. This results in smaller correction factors to be applied to the response of the TL element in position 1 when the deep dose index is estimated.

Element 18 is covered by filter 14 including a copper filter element 23, as illustrated. The variation with energy of the photon attenuation characteristics of the copper filter element 23 located in position 2 gives the dosimeter the ability to act as a crude energy spectrometer for low energy photons.

TL element 20 in position 4 is a neutron sensitive, TLD-600 phosphor (Lithium-6 enriched fluoride) having a preferred thickness of 0.4 mm. This element is shielded by a 300 mg/cm$^2$ tissue equivalent filter to enable dose estimation to the lens of the eye and to measure neutron dose in the absence of thermal neutrons. TLD-600 and TLD-700 type phosphors are available from Harshaw Crystal & Electronic Products, Solon, Ohio.

It is noted that the thick (0.4 mm) TL components of dosimeter 10 are less than a heretofore standard thickness of 0.9 mm by at least about a factor of 2. It also is noted that nearly tissue equivalent TL elements and tissue equivalent filters are used. A plastic filtration of 1000 mg/cm$^2$ for deep dose estimation is preferred over lead filters which heretofore have been used.

As in conventional personnel dosimetry systems, the dosimeters are worn by personnel so that the dosimeters will be exposed to the same amount and type of radiation. On a periodic basis such as daily the dosimeters are read by a TLD card reader. A preferred TLD card reader is a Model 8800 automatic TLD card reader sold by Harshaw Crystal & Electronic Products, Solon, Ohio. The Model 8800 TLD card reader utilizes a non-contact heating technique based on pre-purified hot nitrogen gas. The Model 8800 TLD card reader employs a programmable, precisely controlled linear time temperature profile for reproducible heating of the dosimeter elements. This is desirable because the amount of radiation induced TL is dependent on the thermal history of the material as well as on the heating rate during readout. A fully controlled heating cycle is therefore important especially for low dose measurements. Various aspects of the Model 8800 TLD card reader are disclosed in U.S. patent application Ser. Nos. 721,334 (filed Apr. 9, 1985) and 035,439 (filed Apr. 7, 1987).

For the most part TL elements can not all be manufactured to have exactly the same TL efficiency [TL efficiency (TLE) is defined as the emitted TL light intensity per unit of absorbed dose]. In view of this, individual element correction coefficients (ECC's) preferably are defined, developed and applied.

A batch of TL elements typically has variation in TL efficiencies of 10–15% (one relative standard deviation). This spread can be virtually reduced to 1–2% if ECC's are applied. Generation of EEC's is based on relating the TL efficiency of each TL element of the entire dosimeter population, i.e., the field dosimeters, to the mean TL efficiency of a small subset of this population which is used only for calibration purposes, i.e., calibration dosimeters. When the ECC is applied to the response of each individual TL element of any of the field or calibration dosimeters, its TL efficiency is virtually identical to the mean value of the calibration dosimeters group and as a result all the TL elements have ideally the same TL efficiency. For a detailed discussion of the general concept of element correction coefficients, reference may be had to Plato et al, "Production of Element Correction Factors for Thermoluminescent Dosimeters", *Health Physics,* 49, 873–881 (1985).

As used herein, TL response (TLR) of a specific TL element is defined as the measured quantity which results from subjecting the dosimeter to one unit of a given ionizing radiation. The units in which the measured quantity is expressed depends on the means which are used to detect the emitted TL photons. If every single photon emitted by the TL element could be counted and the units of the ionizing radiation expressed in terms of dose, the TL response would be equal to the TL efficiency. Normally this is not the case and the measured quantity is either expressed in units of charge or in units of counts for charge integration and photon counting TL measuring techniques, respectively. For background information, reference may be had to Spanne, "TL Readout Instrumentation", Thermoluminescence and Thermoluminescent Dosimetry, Vol. III, Ch. 1, CRC Press, Orlando, Fla. (1984). Irrespective of the method of measurement which is being used, the TL response of a element in position i will always be proportional to the TL efficiency; that is:

$$TLR_i = k_i TLE \qquad (1)$$

where $k_i$ is the proportionality constant. The proportionality constant $k_i$ does not have to be identical from one position to another due to different photomultiplier gains, for example.

The calibration dosimeters may all be subjected to a quantity L of ionizing radiation from a given source where L can be expressed in any convenient units. For example, the quantity L may be expressed in units of time of irradiation, providing that for each dosimeter the geometry relative to the source is kept constant and the radiation field is penetrating enough to deposit energy in the entire dosimetric volume. Since the measured TL effect is the sum over the entire sensitive volume of the TL element, the energy deposition profile does not have to be uniform as long as it is identical for each dosimeter.

By letting $ECC_{ij}$ be the element correction coefficient for element i in card j (i = 1,2,3,4 and j = 1,2,...,l where l is the number of calibration cards), and letting $TLE_{ij}$ and $TLR_{ij}$ be the TL efficiency and the TL response of element ij, respectively, then the following equation can then be defined:

$$ECC_{ij} < TLE >_i / TLE_{ij} \qquad (2)$$

when $$<TLE>_i = \sum_{j=1}^{1} TLE_{ij}/1 \qquad (3)$$

where "< >" is used to denote the average value. With the aid of equation (1), equations (2) and (3) can be written in the form:

$$ECC_{ij} = <TLR>_i/TLR_{ij} \qquad (4)$$

$$<TLR>_i = \sum_{j=1}^{1} TLR_{ij}/1 \qquad (5)$$

An implicit assumption in writing equations (4) and (5) is that the TLD reader response to TL photons did not change during the measurement of the entire population of the calibration cards, i.e., $k_i$ remains constant during the entire TL readout process. Since this step is important to the success of generating true ECC's, it is important to perform it in a relatively short period of time and to ensure the stability of the light detection and the heating subsystems by frequent reference light measurements and glow curve analysis to ensure complete readout.

It is convenient to express equations (4) and (5) in terms of the quantity which is reported by the TLD reader (charge or counts). If $Q_{ij}$ is defined to be the charge reported by the reader for element ij following its subjection to n irradiation a quantity L of ionizing radiation, $TLR_{ij}$ and $<TLR>_i$ can be written in the form:

$$TLR_{ij} = Q_{ij}/L \qquad (6)$$

and $$<TLR>_i = <Q>_i/L \qquad (7)$$

when $$<Q>_i = \sum_{j=1}^{1} Q_{ij}/1 \qquad (8)$$

Using equations (6), (7) and (8), equation (4) can be written in $$ECC_{ij} = <Q>_i/Q_{ij} \qquad (9)$$

when $<Q>_i$ is given by equation (8).

Once ECC's have been established for the calibration cards, each of them has virtually the same TL efficiency and any statistically significant subset of calibration cards can be used to generate ECC's for the field cards. Of course a TLD reader for various reasons may change its response to TL photons since the time that $<Q>_i$ was generated. For example, this change may result from an intentional or accidental change in the high voltage power supply setting, replacement of damaged photomultiplier tubes, replacement of infrared (IR) filters or accumulation of dirt on the IR filters. If the response of the reader has changed by a factor of $C_i$ for each corresponding position (i=1,2,3,4) in each TLD card, which change will equally affect the TL elements, the following equation can be written:

$$<<Q>'_i = C_i <Q>_i \qquad (10)$$

and $$q'_{ij} = C_i q_{ij} \qquad (11)$$

where $q_{ij}$ is the charge that would have been reported by the reader for element i of field card j at the time that $<Q>_i$ was generated, $<Q>'_i$ is the average reported charge from the calibration cards which were exposed and read together with the field cards whose element correction coefficients have to be generated, and $q'_{ij}$ is the charge reported by the reader for element i of field card j following its subjection to quantity L of ionizing radiation. The foregoing assumes that the subset of calibration cards were also exposed at the same time and read together with the field cards.

Similar to equation (9), the element correction coefficients $ecc_{ij}$ for field cards can be defined as follows:

$$ecc_{ij} = <Q>'_i/q'_{ij} \qquad (12)$$

It is noted that the same ecc values for field cards would have been obtained if they were generated at the time that the ECC's for the calibration cards were generated or at any other time, since the $C_i$ values from equations (10) and (11) would be canceled out in equation (12). Once the ecc's for the field cards have been generated and the ecc is applied, its TL efficiency is virtually equal to the mean TL efficiency of the calibration cards and as a result, all the card population will have virtually the same TL efficiency. When new cards are purchased or added, their TL efficiency can be virtually set to be equal to the existing card population by generating ecc's for the new cards. The only parameter which need remain constant is the inherent sensitivity of the calibration cards which are being used. Moreover, TLD cards of the above described type read by the above identified reader can be subjected to hundreds of reuse cycles without any noticeable change in their TL efficiency.

The radiation source that is used for generating the element correction coefficients for the field cards does not have to be the one used for generating the ECC's for the calibration cards provided that a subset of calibration cards are subjected to the same radiation field as the field cards whose ecc's are generated. Moreover, there is no need to irradiate the TLD cards mounted in their holders since the only purpose of this irradiation is to induce an excitation in the TL material which will result in a measurable TL signal that is proportional to the TL efficiency of the TL element. The interpretation of the dosimeter reading in terms of absorbed dose or dose equivalent is hereinafter discussed.

The TL elements under controlled operational conditions will not change their TL efficiency and the irradiation geometry can be easily maintained given that radiation sources generally are stable, or at least it is relatively easy to apply correction factors to account for the decay of the radioactive material. Normally the only part of the system that will not remain sufficiently stable over long periods of time or in which something can go wrong is the TLD reader. To maintain a known relationship between the ability of the reader to convert stored TL information to measurable electric signals (charge or counts) by heating the TL elements and detecting the emitted light, it is convenient to express the ratio between the TL response of the calibration cards and the delivered radiation quantity L in terms of one variable. Since the numerical value of this variable will be mainly dependent on the condition of the reader at a given date and time, it is appropriate to call this variable a reader calibration factor (RCF). As shown elsewhere herein, the value of the RCF although not expressed yet in terms of "real" dose units provides the main link between the TL response in terms of charge or counts and the absorbed dose or dose equivalent in terms of rad or rem.

The reader calibration factor for position i, $RCF_i$, can be defined as follows:

$$RCF_i = <Q>_i/L \tag{13}$$

where $<Q>_i$ is the TL response of a set of calibration cards exposed to a known quantity of radiation L. As discussed above, the radiation quantity L can be expressed in any convenient units. Accordingly, the unit gU (generic unit) can be used as the unit in which the quantity L is expressed. For example, 1 gU can be equal to the amount of irradiation delivered during a period of one second by a specific source with a specific geometry to a dosimeter located at a specific distance from the source. Since the definition of the unit gU is somewhat arbitrary, once defined for a specific source and geometry, it will have meaning only for such source and geometry. This source and geometry herein will be called the local source or reference source.

The gU has some similarity to conventional units in the sense that gU is the unit of the quantity L in a similar way as the Roentgen (R) is the unit of exposure and the rad and the rem are the units of absorbed dose and dose equivalent, respectively. However, unlike the conventional units which have universal meaning, i.e., 1 R in California represents the same amount of radiation as 1 R in Mexico City. In comparison, the amount of radiation which corresponds to 1 gU is completely arbitrary and depends on the way in which one chooses to define his own gU. The link between gU and rad or rem is established in the below discussed manner inasmuch as the purpose of a dosimetry system is to enable the measurement of absorbed dose or dose equivalent.

To obtain a meaningful RCF, it is necessary to accurately reproduce the irradiations of the calibration dosimeters. One way to do this is to use periodically calibrated and NBS (National Bureau of Standards) traceable sources which are usually located at special testing or calibration laboratories. In this case the quantity L will be the exposure or whatever quantity the source is calibrated for, and the gU will be the Roentgen (R) or any other corresponding unit. Besides the inconvenience that this method creates from the point of view of the time, expense, planning, the danger of damage or exposure of the dosimeters during shipping, and the inability to expose dosimeters in a short notice when a new RCF has to be generated (a PMT tube has been replaced for example), this approach does not provide much advantage over the use of a local reference source for generating the RCF, since the RCF is a relative quantity.

Returning to equation (12), the ecc's for the field cards can be expressed in terms of the RCF using equation (13):

$$ecc_{ij} = (RCF_i/q_{ij})L \tag{14}$$

From equation (14), L can be expressed in terms of the RCF, ecc and q:

$$L = (q_{ij}ecc_{ij})/RCF_i \tag{15}$$

Once the ECC's and ecc's for calibration cards and field cards have been generated, respectively, and the local unit gU has been defined, the link to an NBS calibrated source located at the calibration laboratory can now be established.

The calibration laboratory is able to perform the irradiations and report the delivered quantity in terms of shallow dose and deep dose. A subset of the calibration cards in their holders (or any other set of cards which have ECC's) is exposed to Hs and Hd, shallow and deep dose, respectively, from say a Cs-137 calibrated source and read out. The reader will report its findings in units of gU using equation (15); however, since the values of Hs and Hd as reported by the calibration laboratory are known, one can establish the following relations between the local units gU and the "risk related quantity" units, rem:

$$LHs = L/Hs \tag{16}$$

for the shallow dose conversion factor, and $$LHd = L/Hd \tag{17}$$

for the deep dose conversion factor.

Both LHs and LHd are expressed in units of gU/rem and provide the link between the local source and the NBS calibration standard, in a similar way that the RCF value provides the link between the internal units of the reader (counts or charge) and the local source. For charge integration systems, the RCF is expressed in units of nC/gU and the quantities RCF*LHs and RCF*LHd are expressed in terms of nC/rem and provide the link between the internal units of the reader and the shallow and the deep doses. Through routine calibration of the TLD reader directly in terms of "nC/deep rem" and "nC/shallow rem", there would be no need to establish the relations (16) and (17). Since the definition of the gU unit is based on exposing some calibration cards to the local source following a reproducible procedure, the time intervals between preparation and irradiation and between irradiation and readout is not important as long as it is kept constant or, if not, fading is eliminated by removing the low temperature peaks.

The time interval between irradiation at the calibration laboratory and readout does not have to be the same as the time interval used for generating the RCF. The reason for this is that the gU is defined for a specific time between irradiation and readout and as long as this time is kept constant the definition of gU will not change. The only case when fading corrections have to be applied or the low temperature peaks have to be removed would normally be when one wants to apply the values of LHs and LHd to calculate the reported dose from a field dosimeter. In this case, the differences in the fading during the time intervals between the field irradiation and readout and the NBS calibration irradiation and readout have to be corrected or, alternatively, the low temperature peaks have to be removed.

Since the dosimeter may respond differently to different types of radiation fields or various mixtures (different gU/rem values), the dosimeter response is experimentally characterized and the results of this characterization is used in the interpretation of dosimeter readings for unknown dose and radiation field combinations. In order to calculate specific dose equivalent values, knowledge of the type of radiation field or mixture that the dosimeter was subjected to is needed. The following procedure is provided for identifying the radiation field using the dosimeter readings.

Direct information from the dosimeter reading which is available for determining the radiation field type includes the L values from the different dosimeter positions, i.e., $L_1$, $L_2$, $L_3$ and $L_4$ [see equation (15)]. The TL element in position 4 is sensitive to neutrons and is reserved for applications involving neutron fields. The remaining three elements at positions 1, 2 and 3 form two independent ratios L3/L1 and L3/L2. The ratio L3/L1 as a function of the ratio L3/L2 can be represented as a function $f(x)$, i.e., $$x = L3/L2 \tag{18}$$

and $$f(x) = L3/L1 \tag{19}$$

The shape of this function and how fast it changes for different energies and compositions is important to the dosimeter's ability to discriminate different radiation fields and/or to determine the relative contribution of components in mixed fields.

For a mixture of two radiation fields "a" and "b", the response of each TL element may be viewed as the weighted sum or superposition of its individual response to fields "a" or "b" as if the other field would not exist. This assumption means that there is no interaction between the induced TL effects when the dosimeter is subjected to two or more different radiation fields. This assumption is generally valid although there has been reported in the literature evidence that in some cases the TL response resulting from mixtures of radiation fields may not be additive, such as in the case of fast neutrons where a decrease of 10% in the gamma TL signal has been observed as a result of the tendency of fast neutrons to release the stored gamma induced signal from previous or simultaneous gamma irradiation. However, if non-additive effects exist for mixed beta and gamma fields they are expected to be small and data has shown that this assumption of superposition of radiation fields is valid to within a few percent.

This superposition principle can be applied to determine f(x) as follows. First let N be the relative contribution of field "a" to the mixed field and assuming that only two fields exist, 1−N will be the relative contribution of field "b". If the delivered quantities are expressed in terms of Roentgen or rad in air, N and 1−N will be the weighting factor assigned to each field (for example, if irradiation is effected such that there are 4 rads in air from field "a" and 2 rads from field "b", then N=0.67 and 1−N=0.33). It is noted that these delivered quantities are in air and that they are correlated to the delivered shallow and deep dose using the $C_{x,s}$ and $C_{x,d}$ values, respectively. Also define the relative response, $a_i$, $b_i$ (i=1 to 4), of each element to pure field "a" or "b" to be the response of the particular element in units of gU per unit of delivered dose in air when only one field is being used.

Using the above superposition principle, the relative response $ab_i$ of element i to a mixture of fields "a" and "b" is written as follows:

$$ab_i = Na_i + (1-N)b_i \tag{20}$$

Then with the aid of equation (20) any one of the L3/L1 and L3/L2 ratios in a mixed field can be expressed in terms of the relative response of each of the elements to the pure fields:

$$L3/L1 = ab_3/ab_1 = [Na_3 + (1-N)b_3]/[Na_1 + (1-N)b_1] \tag{21}$$

and similarly, $$L3/L2 = ab_3/ab_2 = [Na_3 + (1-N)b_3]/[Na_2 + (1-N)b_2] \tag{22}$$

Using x for L3/L2, equation (22) can be rewritten in the form:

$$N = [b_3 - xb_2]/[x(a_2-b_2)-(a_3-b_3)] \tag{23}$$

Substituting N from equation (23) into equation (21) and using f(x) for L3/L1, equation (21) can be rewritten in the form:

$$f(x) = [b_3a_2 - a_3b_2]x/[(b_1a_2 - a_1b_2)x + (a_1b_3 - b_1a_3)] \tag{24}$$

Equation (24) is used to identify the mixture in the following manner.

The calibration constants $a_i$ and $b_i$ all are determined once by performing calibration irradiations at the NBS or NBS traceable calibration laboratory for all the possible radiation fields of interest (all the possible a's and b's) which may be used as model fields to simulate possible different responses of the dosimeter to various radiation fields which may occur in the field. Once those calibration constants are known, the value of x (the ratio L3/L2) is computed from the response of the dosimeter. f(x) is then computed for this particular x and for all possible radiation field mixtures "a" and "b".

The next step is to compare the measured L3/L1 value to all the calculated f(x) (all the possible computed L3/L1 ratios for the particular measured L3/L2 ratio) and select the one which provides the smaller percentage deviation between the measured and the computed L3/L2 ratios to represent the required type of radiation fields mixture, i.e., the identity of "a" and "b". Once "a" and "b" have been identified, equation (23) can be used to calculate the relative contribution of each component, N and 1−N for fields "a" and "b", respectively. If none of the computed L3/L1 ratios is in reasonable agreement with the measured one, the reading should be considered questionable and the dose values have to be otherwise assigned such an manually. Such lack of agreement, for example, may result from radiation fields which are different from those that were covered by the calibration, or the dose may have been too low to provide meaningful measure of the value of N. As will be appreciated, the dose may be calculated based on the average value of the calibration constants which are tabulated in Table 2.

In the foregoing manner the components in a mixed field can be identified and the relative contribution of each component can be determined. Once the components and their relative contributions are known, the deep and the shallow dose in a mixed field can be computed.

Deep and shallow dose are determined from the TL response in units of gU, $R_1$ and $R_3$ for TL elements 1 and 3, respectively. From the calibration run at the calibration laboratory, deep and shallow dose calibration values for each of the pure fields can be computed in the following manner.

First let $Ra_1$ be the response of the element 1 in units of gU when the dosimeter is exposed to d rem of deep dose and $Ra_3$ be the response of element 3 in units of gU when the dosimeter is exposed to s rem of shallow dose using pure field "a" as reported by the calibration laboratory. Similarly, the variables $Rb_1$ and $Rb_3$ are defined for pure field "b". Also, pure field calibration values, $r_{a1}$ and $r_{a3}$, in terms of gU per deep rem and gU per shallow rem for field "a", are defined as follows:

$$r_{a1} = Ra_1/d \text{ [gU/rem]} \quad (25)$$

and $$r_{a3} = Ra_3/s \text{ [gU/rem]} \quad (26)$$

Similarly $r_{b1}$ and $r_{b3}$ are defined for pure field "b":

$$r_{b1} = Rb_1/d \text{ [gU/rem]} \quad (27)$$

and $$r_{b3} = Rb_3/s \text{ [gU/rem]} \quad (28)$$

In accordance with the above discussed superposition principle, mixed field calibration factors $r_{ab1}$ and $r_{ab3}$ for deep and shallow dose, respectively, can be defined to be:

$$r_{ab1} = Nr_{a1} + (1-N)r_{b1} \text{ [gU/rem]} \quad (29)$$

and $$r_{ab3} = Nr_{a3} + (1-N)r_{b3} \text{ [gU/rem]} \quad (30)$$

Finally, deep and shallow dose can be computed from the TL response in units of gU, $R_1$ and $R_3$ for elements 1 and 3, respectively, and using equations (29) and (30) as follows:

$$DEEP\ DOSE = R_1/r_{ab1} \text{ [rem]} \quad (31)$$

and $$SHALLOW\ DOSE = R_3/r_{ab3} \text{ [rem]} \quad (32)$$

An application of the above formalism to experimental results will now be described in detail.

145 dosimeters were supplied in a single batch to a calibration laboratory to be irradiated to various qualities and quantities of radiation from various beta and gamma fields. Each dosimeter had a serial number that uniquely identified the dosimeter and specified the radiation field to which the dosimeter was to be exposed according to a predetermined irradiation plan. 15 shipping control and replacement dosimeters were also included. The irradiation procedures followed the Department of Energy Standard for the Performance Testing of Personnel Dosimetry Systems [DOE/EH-0027 (1986)].

40 dosimeters in groups of 5 were exposed to 8 different pure radiation fields as specified in DOE/EH-0027 and summarized in Table 1. The response of those dosimeters were used to generate the various calibration factors as above described. 10 other dosimeters were exposed to the accident categories (I and II) and their response is used to test supralinearity corrections.

TABLE 1

| | Calibration Irradiations | |
|---|---|---|
| | Radiation Field | Energy |
| 1 | x-ray NBS filtered Technique - M30 | 20 keV |
| 2 | x-ray NBS filtered Technique - S60 | ·36 keV |
| 3 | x-ray NBS filtered Technique - M150 | 70 keV |
| 4 | x-ray NBS filtered Technique - H150 | 120 keV |
| 5 | Gamma Cs-137 | 662 keV |
| 6 | Beta (Point geometry) Tl-204 | 760 keV (max) |
| 7 | Beta (Point geometry) Sr/Y-90 | 2300 keV (max) |
| 8. | Beta (Slab geometry) Uranium | 2300 keV (max) |

The remaining 95 dosimeters were irradiated using 19 different mixtures of photons and beta rays and their response together with the response of the dosimeters that were exposed to the pure fields were used to test the above described dose calculation algorithm.

The dose levels used to calibrate the system were relatively high, 420-2000 mrem for the total deep dose; therefore, no environmental background was subtracted and, additionally, no fading corrections were applied. The following results that are presented were all obtained using "raw data" and therefore represent the worst possible case from the point of view of the lack of background or fading corrections.

50 cards from a different batch were used as calibration dosimeters and were treated in the above described manner. 10 of these cards were used to generate element correction coefficients for the dosimeters which were sent to the calibration laboratory and which were treated as field cards.

The unit gU was defined as the amount of irradiation delivered during a period of 0.1 seconds by the internal Sr/Y-90 irradiator employed in the TLD reader. The reference cards were prepared immediately before irradiation and readout 30 minutes following the end of the irradiation period. Due to the small periods of time involved, care was taken to preserve the order of the cards during all of the irradiation and readout steps (i.e., the cards were read out in the same order that they were exposed). Since this procedure usually should involve a relatively small number of cards (3 to 10), it is relatively easy to maintain their order. When dealing with a larger number of cards, it would be a good practice to eliminate the low temperature peaks or to wait a longer period of time, such that the time elapsed between irradiation and readout will be significantly larger than the irradiation time of the complete batch. For example, if the irradiation time is 2 hours a period of 12 hours will be adequate since most of the fast fading component, peak 2, will disappear. In cases like that, it is not important (and also not practical) to try to keep the cards in order.

The TL response of the calibration cards was used as a measure of the amount of gU units that were delivered. It is appropriate, therefore, to link the particular irradiation and readout parameters to the gU definition.

Before estimating the deep and shallow dose for the mixture categories, the calibration factors $r_{ai}$ and $a_i$ were calculated using the response of the dosimeters to the pure fields, and the delivered deep dose, shallow dose and delivered exposure or dose supplied by the calibration laboratory. The results of this calibration are shown in Tables 2 and 3 for $r_{ai}$ and $a_i$, respectively.

TABLE 2

| | Pure Field Calibration Factors - gU/rem | |
|---|---|---|
| Source | Deep Dose - $r_{a1}$ | Shallow Dose - $r_{a3}$ |
| 1 M30 | 693.0+ − 11.1(1.6%) | 837.6+ − 19.7(2.4%) |
| 2 S60 | 942.9+ − 15.1(1.6%) | 1008.1+ − 22.0(2.2%) |
| 3 M150 | 805.4+ − 16.3(2.0%) | 848.1+ − 10.9(1.3%) |
| 4 H150 | 726.5+ − 39.6(5.5%) | 737.2+ − 20.3(2.8%) |
| 5 Cs-137 | 659.8+ − 14.5(2.2%) | 667.7+ − 11.7(1.8%) |
| 6 Tl-204 | — | 498.0+ − 7.6(1.5%) |
| 7 Sr/Y-90 | — | 716.0+ − 10.9(1.5%) |
| 8 Uranium | — | 408.6+ − 10.1(2.5%) |

TABLE 3

| | Pure Field Relative response - gU/R or gU/rad | | | |
|---|---|---|---|---|
| Source | $a_1$ | $a_2$ | $a_3$ | $a_4$ |
| 1 M30 | 311.8 | 95.6 | 904.6 | 736.1 |
| 2 S60 | 1008.8 | 820.7 | 1159.4 | 1191.5 |
| 3 M150 | 1183.8 | 1220.0 | 1195.6 | 1268.3 |
| 4 H150 | 1024.2 | 1073.5 | 1039.4 | 1103.9 |
| 5 Cs-137 | 679.5 | 681.1 | 687.6 | 723.4 |
| 6 Tl-204 | 2.9 | 2.7 | 497.9 | 5.0 |
| 7 Sr/Y-90 | 31.2 | 157.9 | 696.0 | 241.0 |
| 8 Uranium | 22.9 | 64.6 | 408.6 | 97.7 |

Each calibration factor was computed averaging the response of 5 dosimeters which were exposed simultaneously to the same radiation field. The uncertainties shown in Table 2 represent one standard deviation of the average. The percentage standard deviation is given in parentheses and, with the exception of one case where its value is 5.5%, all the other values lie in the range of 1.3–2.8%. Considering the fact that the determination of these calibration factors were a result of two complete sets of independent measurements, i.e., ecc generation using the local reference source and then performing the calibration irradiation at the calibration laboratory, these figures represent excellent precision of the entire system, i.e., dosimeters (cards and holders), TLD reader and irradiation facilities.

The $a_i$ values tabulated in Table 3 were measured with a similar precision (error is not shown).

Figure 4:
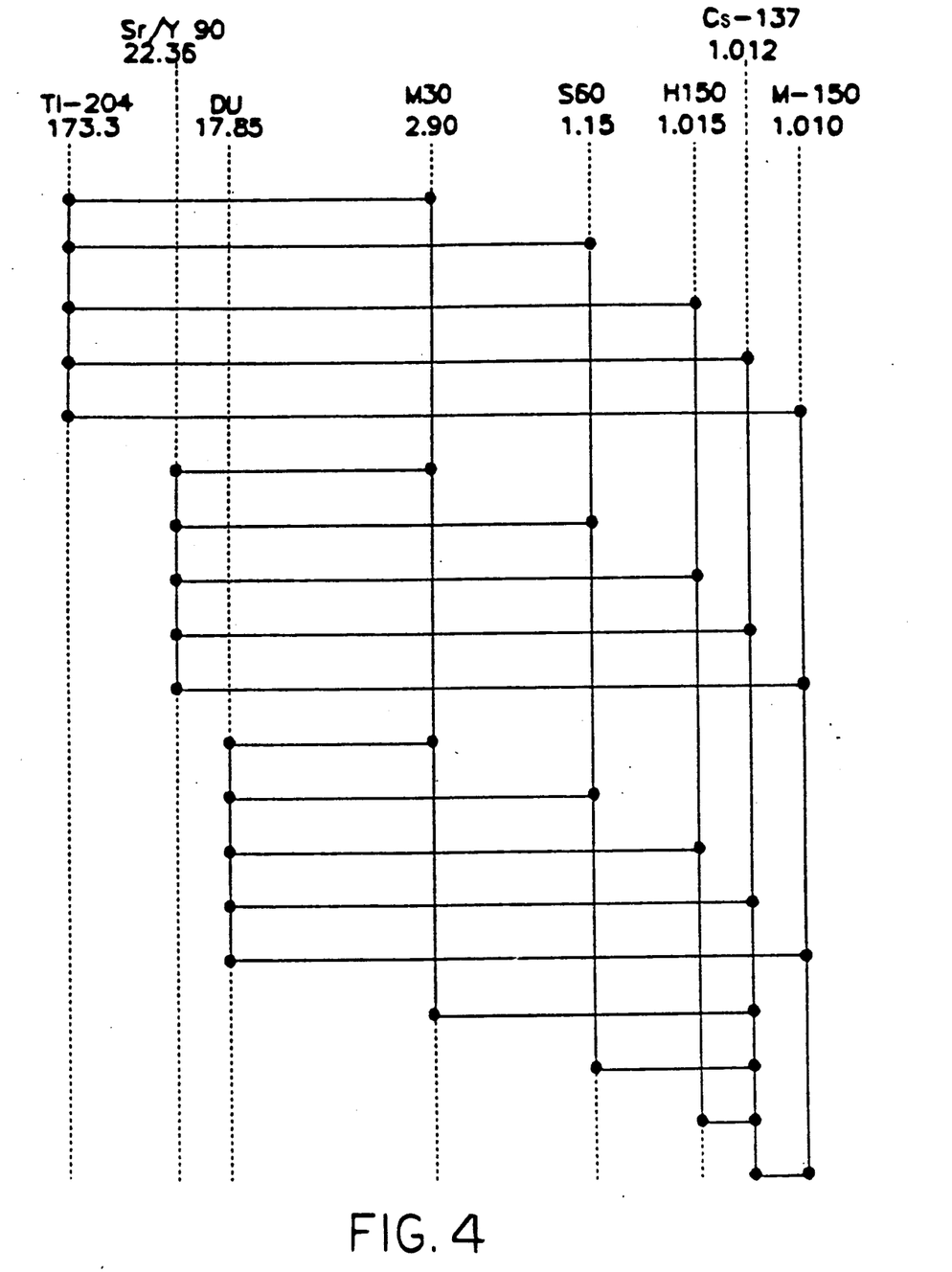
FIG. 4 is an illustration of a variety of possible element response ratios for a single ratio (L3/L1)

The variety of possible L3/L1 ratios for different field mixtures and compositions are shown in FIG. 4. This diagram, which is not scaled and in which only the extremes are marked, illustrates that only a limited amount of information related to the mixture composition can be derived from the response of only 2 TL elements (one ratio). A similar diagram (not shown her) could be drawn for the L3/L2 ratio. The L3/L1 ratios for the higher energy photon fields, M150, H150 and Cs-137, are all identical and equal to approximately 1.00 within the experimental error which is 2-3%.

However, when the L3/L1 ratio is plotted as a function of L3/L2, the "degeneracy" shown in FIG. 4 is removed and each mixture type is identified by its own unique pattern which herein is called the mixture identification curve (MIC). Typical results for various mixtures are shown in FIGS. 5, 6 and 7 which illustrate a family of curves calculated using equation (24) and the calibration parameters tabulated in Table 3 ($a_4$ is not being used for photon-beta fields and is reserved exclusively for irradiations involving neutrons).

Figure 5:
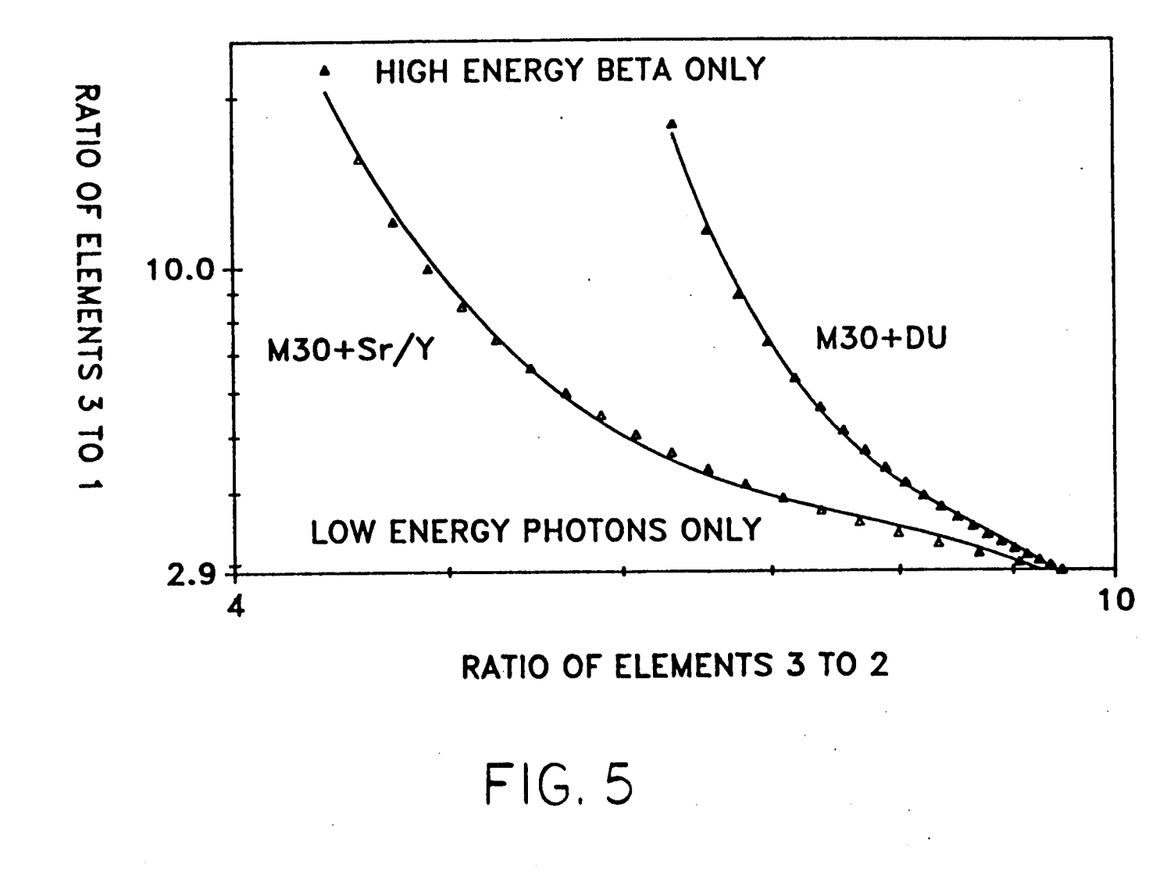
FIG. 5 is a graphical illustration showing mixture identification curves (MIC's) for low energy photons and high energy beta mixed radiation fields.

FIG. 5 overlays the MIC's for the mixture of low energy photons (M30) with either Sr/Y-90 or depleted uranium (DU). Both curves start from the same point where only M30 is present in the mixture and then begin to diverge as the beta component contribution is increased. The symbols represent values calculated using equation (24) and correspond to various N values starting at N=1.00 where only low energy photons are present and then continuously decreasing by steps of 0.05 down to N=0.00 where only beta particles are present in the mixture. The continuous lines are third order polynomial regressions and were plotted to guide the eye.

Figure 6:
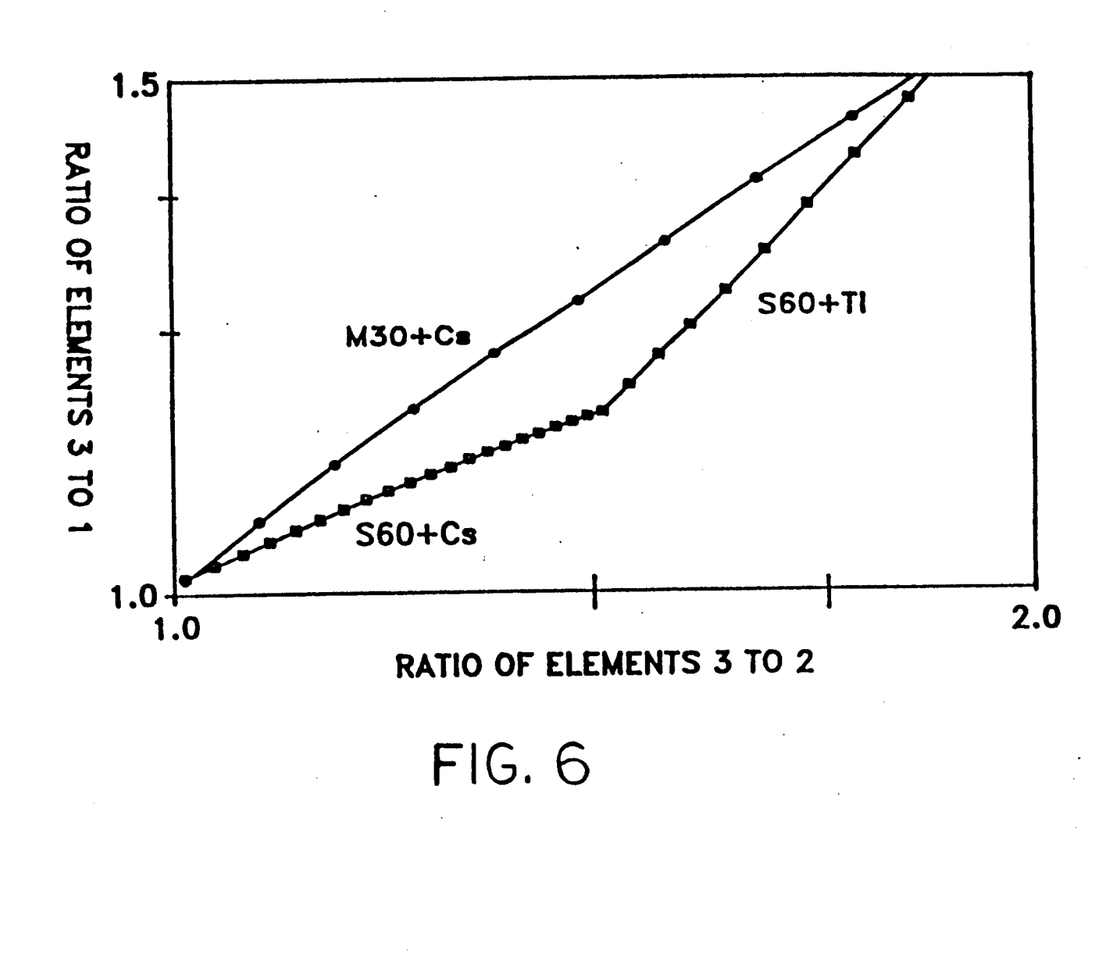
FIG. 6 is a graphical illustration showing mixture identification curves for low and high energy photons and for low energy photons and low energy beta rays.

The discrimination ability of this method is further demonstrated in FIG. 6 where MIC's for mixtures of high energy photons with low energy photons and low energy photons with Tl-204 beta rays are plotted. Of particular interest are the mixtures of S60 with either Cs-137 or Tl-204 where one curve starts at the same point that the other is terminated. Accordingly, the mixture could be identified utilizing only one of the element ratios (either L3/L1 or L3/L2), but this will occur only rarely.

Figure 7:
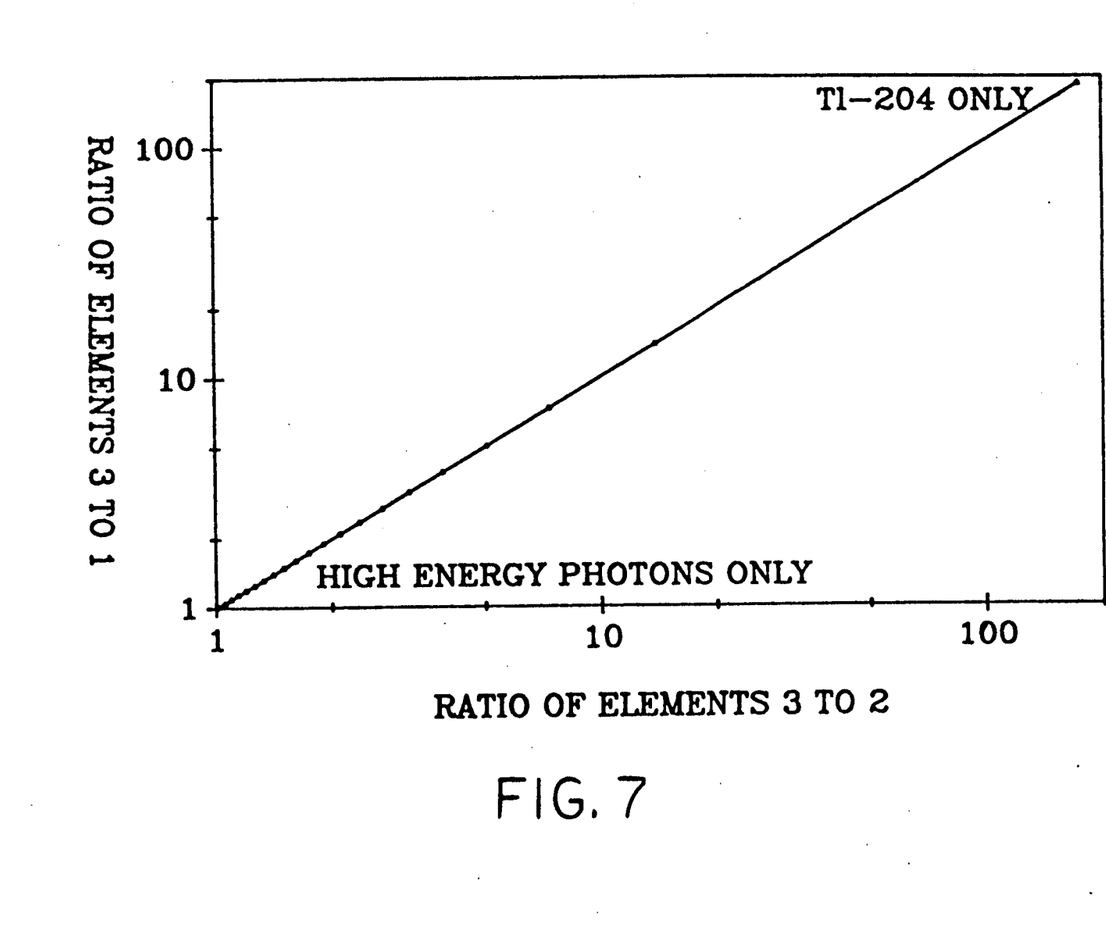
FIG. 7 is a graphical illustration showing mixture identification curves for high energy photons and low energy beta mixed radiation fields.

FIG. 7 shows MIC's for mixtures involving Tl-204 beta rays with M150, H150 and Cs-137. The ability to discriminate between the photons and the beta fields is well demonstrated. However, there is no discrimination ability between these three photon fields among themselves.

From Table 2 it can be seen that the over-response of the dosimeter relative to Cs-137 is approximately 20–25% with M150 and about 10% with H150. Since there is no clear discrimination among these three sources, whenever one of them is identified in a mixture the calibration factors ($r_{abi}$) are set to the average of the individual $r_{ai}$ values for those three photon fields. This procedure will overestimate the reported dose from the M150 source by approximately 10–13% and underestimate the response to the Cs-137 and the H150 sources by approximately 10% and 3–5%, respectively.

This bias, which is still well within acceptable tolerance levels such as those established by DOELAP, represents the upper limit of the intentional "build-in" under- or over-response and will be fully applied only when those photon fields are pure. In a mixture, this bias is weighted down according to the relative contribution of the other component (the value of N).

Although less pronounced, a similar situation may occur in some mixtures involving Tl-204 or depleted uranium. Examining Table 2, it can be ascertained that the shallow dose responses of the two beta sources are within 20%. Again, if the average of the individual calibration factors ($r_{a3}$s) is used whenever Tl-204 or DU are identified in a mixture, the maximum "build-in" overestimation or underestimation of the DU or the Tl-204 dose will be 10%, again well within acceptable DOELAP tolerance levels. For the calculations and results presented the presence of a beta component was identified automatically by the algorithm; however in some cases, the identity of the beta field (DU, Tl-204, etc.) was assigned manually for the purpose of the verification of the superposition assumption. Similarly, for two mixtures involving M30 (20 keV) and S60 (36 ke V) photons, with Sr/Y-90 beta particles, S60 was identified instead of M30 and Cs-137 instead of S60. In these two cases, the field identity was also assigned manually. Other than that, the radiation fields discrimination capabilities are clear particularly for photons and beta particles in a mixed photon beta field.

The above described procedures were applied to the raw data from 8 different pure radiation fields involving 40 dosimeters that were used to generate the calibration factors. In addition the same procedures were applied to 19 different mixture irradiations using another group of 95 dosimeters that were not used for the various calibrations. The results obtained from those dosimeters may serve as an independent test of the concepts and methodology herein described.

The mixture identification curve method was applied to all of the 135 dosimeters that were involved. Each dosimeter was treated as if it was exposed to a mixed field and the mixture components were identified. Furthermore, for each dosimeter, the relative contributions of each field, N and 1−N were calculated using equation (23). If N was found to be less than 0.15 or greater than 0.85, the reading was treated as resulting from exposure to a single source and the appropriate pure field calibration factor, $r_{ai}$, was applied [this is equivalent to setting N=0 or N=1 in equations (29) and (30)]. The reason for imposing this limitation on N is that even when the dosimeter is exposed to a pure field, due to the unavoidable uncertainty in the measurement the probability to get exactly 1 or exactly 0 is very small. Furthermore, according to DOELAP the mixture test categories are limited only to N's in the range of 0.25 to 0.75.

TABLE 4

Comparison Between Delivered and Measured N values

| Mixture Components | | Relative Contribution of Field "a" - N | |
|---|---|---|---|
| Field "a" | Field "b" | Delivered | Measured |
| M30 | Cs-137 | 0.696 | 0.674+−0.012 |
| S60 | Cs-137 | 0.491 | 0.441+−0.096 |
| M30 | Tl-204 | 0.483 | 0.561+−0.028 |
| S60 | Tl-204 | 0.466 | 0.458+−0.021 |
| M150 | Tl-204 | 0.416 | 0.515+−0.088 |
| H150 | Tl-204 | 0.415 | 0.464+−0.071 |
| M30 | Sr/Y-90 | 0.474 | 0.471+−0.043 |
| S60 | Sr/Y-90 | 0.458 | 0.470+−0.052 |
| M150 | Sr/Y-90 | 0.407 | 0.457+−0.011 |
| H150 | Sr/Y-90 | 0.406 | 0.410+−0.023 |
| M30 | Uranium | 0.483 | 0.385+−0.061 |
| S60 | Uranium | 0.466 | 0.500+−0.041 |
| M150 | Uranium | 0.416 | 0.421+−0.026 |
| H150 | Uranium | 0.415 | 0.438+−0.034 |
| Cs-137 | Tl-204 | 0.493 | 0.441+−0.075 |
| Cs-137 | Sr/Y-90 | 0.484 | 0.402+−0.056 |
| Cs-137 | Uranium | 0.493 | 0.406+−0.087 |

To test the ability of the herein described system to use the dosimeter response not only to identify the radiation field components but also to measure the relative contribution of each component in a mixed field, the measured N values were compared to the N values as reported by the calibration laboratory ("delivered") for the mixed fields. The results of this comparison, which are shown in Table 4, demonstrate good agreement between the measured and the actual relative contribution of the various radiation fields. No comparison was made for the two mixtures of Cs-137 with M150 or with H150 since no meaningful N values can be computed due to the overlap of their MIC's as described in the previous paragraph.

Some of the element ratios also were calculated using equations (21) and (22), and were found to be in a good agreement with the experimental results as shown in Table 5. In both Tables 4 and 5, the uncertainty is represented by one standard deviation of results from five dosimeters.

TABLE 5

Example of Measured and Calculated Element Ratios

| Mixture Components | | | Element Ratios | |
|---|---|---|---|---|
| Field "a" | Field "b" | Ratio | Calculated | Measured |
| Cs-137 | Sr/Y-90 | L3/L1 | 1.012 | 1.013+−0.036 |
| Cs-137 | M30 | L3/L1 | 1.989 | 1.930+−0.058 |
| Cs-137 | M30 | L3/L2 | 3.095 | 2.916+−0.070 |

The reported deep and shallow doses were calculated from the dosimeter responses using equations (25) to (32) and the calibration factors from Table 2. The results for each category were compiled according to the guideline given in the Handbook For the Department of Energy Laboratory Accreditation Program for Personnel Dosimetry Systems, DOE/EH-0026 (1986), when the bias, B, is given by:

$$B = 1/n \left( \sum_{i=1}^{n} P_i \right) \quad (33)$$

where $P_i$ is the fractional difference between the reported and delivered absorbed dose or dose equivalent for the ith dosimeter, given by:

$$P_i = (Reported_i - Delivered_i)/Delivered_i \quad (34)$$

and the standard deviation is given by:

$$S = \left[ \sum_{i=1}^{n} (P_i - B)^2/(n-1) \right]^{\frac{1}{2}} \quad (35)$$

Figure 8:
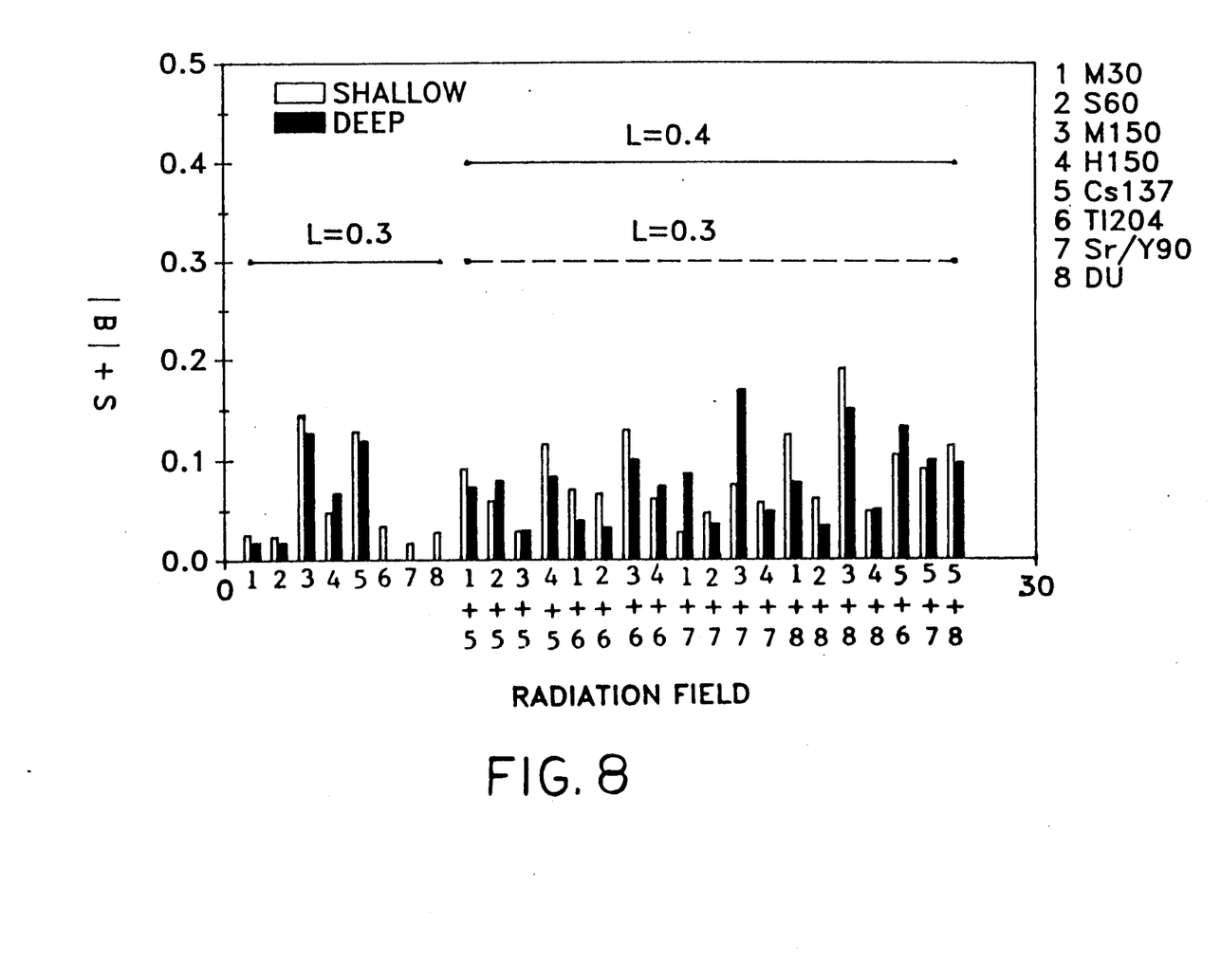
FIG. 8 is an illustration of algorithm verification results.

The $|B|+S$ values for all of the 27 radiation fields involved are tabulated in Table 6 and are represented graphically in FIG. 8. For the pure fields except for the high energy photons, the bias is equal to zero since those values were used for the calibration. For the high energy photons, the B values represent the previously described "build in" bias.

As demonstrated in FIG. 8, all the results are well within acceptable tolerance limits such as the current and planned DOELAP tolerance limits.

TABLE 6

Summary of Verification Results

| | CATEGORY FIELD | | SHALLOW DOSE | | | | DEEP DOSE | | | |
|---|---|---|---|---|---|---|---|---|---|---|
| | | | B | S | B + S | L | B | S | B + S | L |
| 1 | III | M30 | 0.000 | 0.026 | 0.026 | 0.3 | 0.000 | 0.018 | 0.018 | 0.3 |
| 2 | III | S60 | 0.000 | 0.024 | 0.024 | 0.3 | 0.000 | 0.018 | 0.018 | 0.3 |
| 3 | III | M150 | 0.129 | 0.016 | 0.145 | 0.3 | 0.102 | 0.025 | 0.127 | 0.3 |
| 4 | III | H150 | −0.018 | 0.030 | 0.048 | 0.3 | −0.006 | 0.061 | 0.067 | 0.3 |
| 5 | IV | Cs137 | −0.111 | 0.017 | 0.128 | 0.3 | −0.097 | 0.022 | 0.119 | 0.3 |
| 6 | V | Tl204 | 0.000 | 0.034 | 0.034 | 0.3 | 0.000 | 0.000 | 0.000 | N/A |
| 7 | V | Sr/Y90 | 0.000 | 0.017 | 0.017 | 0.3 | 0.000 | 0.000 | 0.000 | N/A |
| 8 | VI | DU | 0.000 | 0.028 | 0.028 | 0.3 | 0.000 | 0.000 | 0.000 | N/A |
| 9 | VII | M30 + Cs137 | −0.069 | 0.022 | 0.091 | 0.4 | −0.059 | 0.014 | 0.073 | 0.4 |
| 10 | VII | S60 + Cs137 | −0.034 | 0.025 | 0.059 | 0.4 | −0.044 | 0.035 | 0.079 | 0.4 |

TABLE 6-continued

| | | Summary of Verification Results | | | | | | | |
|---|---|---|---|---|---|---|---|---|---|
| | | SHALLOW DOSE | | | | DEEP DOSE | | | |
| | CATEGORY FIELD | B | S | B + S | L | B | S | B + S | L |
| 11 | VII M150 + Cs137 | 0.007 | 0.022 | 0.029 | 0.4 | 0.004 | 0.026 | 0.030 | 0.4 |
| 12 | VII H150 + Cs137 | −0.096 | 0.019 | 0.115 | 0.4 | −0.068 | 0.015 | 0.083 | 0.4 |
| 13 | VII M30 + T1204 | −0.030 | 0.040 | 0.070 | 0.4 | 0.018 | 0.022 | 0.040 | 0.4 |
| 14 | VII S60 + T1204 | 0.043 | 0.023 | 0.066 | 0.4 | −0.013 | 0.020 | 0.033 | 0.4 |
| 15 | VII M150 + T1204 | 0.051 | 0.078 | 0.129 | 0.4 | 0.087 | 0.013 | 0.100 | 0.4 |
| 16 | VII H150 + T1204 | −0.008 | 0.053 | 0.061 | 0.4 | −0.038 | 0.036 | 0.074 | 0.4 |
| 17 | VII M30 + Sr/Y90 | −0.005 | 0.023 | 0.028 | 0.4 | 0.063 | 0.023 | 0.086 | 0.4 |
| 18 | VII S60 + Sr/Y90 | 0.031 | 0.016 | 0.047 | 0.4 | 0.013 | 0.023 | 0.036 | 0.4 |
| 19 | VII M150 + Sr/Y90 | 0.058 | 0.017 | 0.075 | 0.4 | 0.126 | 0.043 | 0.169 | 0.4 |
| 20 | VII H150 + Sr/Y90 | −0.020 | 0.037 | 0.057 | 0.4 | 0.003 | 0.046 | 0.049 | 0.4 |
| 21 | VII M30 + DU | 0.087 | 0.037 | 0.124 | 0.4 | 0.055 | 0.022 | 0.077 | 0.4 |
| 22 | VII S60 + DU | 0.004 | 0.057 | 0.061 | 0.4 | 0.017 | 0.017 | 0.034 | 0.4 |
| 23 | VII M150 + DU | 0.154 | 0.036 | 0.190 | 0.4 | 0.124 | 0.026 | 0.150 | 0.4 |
| 24 | VII H150 + DU | 0.032 | 0.016 | 0.048 | 0.4 | 0.019 | 0.031 | 0.050 | 0.4 |
| 25 | VII Cs137 + T1204 | −0.074 | 0.030 | 0.104 | 0.4 | −0.114 | 0.018 | 0.132 | 0.4 |
| 26 | VII Cs137 + Sr/Y90 | −0.056 | 0.034 | 0.090 | 0.4 | −0.073 | 0.026 | 0.099 | 0.4 |
| 27 | VII Cs137 + DU | −0.045 | 0.068 | 0.113 | 0.4 | −0.083 | 0.013 | 0.096 | 0.4 |

It is here noted that the above referred to TL measurements were performed using a System Model 8800 automatic TLD card reader sold by Harshaw Crystal & Electronic Products, Solon, Ohio. The Model 8800 TLD card reader utilizes a non-contact heating technique based on pre-purified hot nitrogen gas. The Model 8800 TLD card reader employs a programmable, precisely controlled linear time temperature profile for reproducible heating of the dosimeter elements. This is desirable because the amount of radiation induced TL is dependent on the thermal history of the material as well as on the heating rate during readout. A fully controlled heating cycle is therefore important especially for low dose measurements. However, its most important advantage is the possibility for continuous control of the heating cycle using various feed-back techniques.

The TL signal is accumulated simultaneously from the four TL elements in a card via a charge integration technique using four thermoelectrically cooled photomultipliers. Glow curves were recorded to a maximum temperature of 300° C. at a heating rate of 25° C./sec. No high temperature annealing was applied and the preparation of the dosimeters prior to irradiation consisted of subjecting the dosimeter to one readout cycle through the reader. The residual TL signals using this reader anneal technique were found to be less than 0.5% at the Sr/Y-90 rad level. All the irradiations to determine the element correction coefficients and the reader calibration factor were performed in the reader using an internal shielded 0.5 mCi Sr/Y-90 irradiator with an automatic shutter mechanism that can be timed in units of 0.1 second which corresponds to approximately to 1.2 mrad. The reproducibility of the internal irradiator was found to be better than 1% (one standard deviation of 10 repeatable irradiations) at the Sr/Y 500 mrad level. Furthermore, no significant changes in the glow curve structure were observed due to repeated irradiation and readout.

The calibration irradiations were carried out by the calibration laboratory. For the photon irradiations, the calibrations performed by the calibration laboratory were in agreement with the calibrations performed by NBS between 0.6% and −4.8%. The overall uncertainty in the beta irradiations was estimated to be +/−3%.

In spite of the variety of possible irradiation conditions that might exist in the field, the errors in estimating doses to personnel from external sources can be minimized, providing that appropriate dosimetric tools are being used and enough attention is paid to properly use, characterize and calibrate those tools. Important factors to be considered are: (1) adequate filtration and the use of tissue equivalent or nearly tissue equivalent TL detectors, (2) establishment of local or generic units (gU) using a stable local reference source and stable reference dosimeters for NBS traceability, (3) performance of detailed calibration using variety of NBS calibrated pure fields to establish the various calibration constant $a_i$ and $r_{ai}$, and (4) frequent reader calibration using the local reference source and tracking an possible changes in the reader condition.

Figure 9:
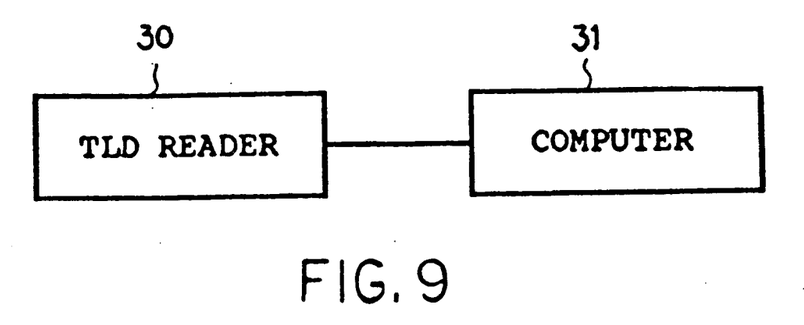
FIG. 9 is a diagrammatic illustration of a personnel dosimetry system according to the present invention.

The above described methodology, to the extent permitted, preferably is carried out by programs and sub-routines of an appropriately programmed computer or processor means. Accordingly, a personnel dosimetry system according to the invention comprises as diagrammatically shown in FIG. 9 an appropriately calibrated TLD reader 30 and a computer 31 programmed to operate on the TL response data acquired by the TLD reader to identify radiation field mixture using correlation functions or curves and to determine dose equivalent.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the appended claims.

What is claimed is:

1. A personnel dosimetry method, comprising the steps of:
    (a) using a dosimeter to monitor exposure of a person to a mixed radiation field, the dosimeter including at least three TL elements filtered to respond differently to the mixed radiation field;
    (b) reading out the TL response of the dosimeter to absorbed radiation;
    (c) using a correlation between two ratios of the responses of two pairs of the TL elements to determine the identity of the radiation field mixture; and
    (d) using the identity of the radiation field mixture to determine dose equivalent.

2. A method as set forth in claim 1, comprising the step of relating the response of the dosimeter to various different radiation fields calibrated by a standardization agency to the response of the dosimeter to a local uncalibrated reference source.

3. A personnel dosimetry system comprising: means for reading out the TL response of a dosimeter to radiation absorbed from a mixed radiation field, the dosimeter including three TL elements that were filtered to respond differently to the mixed radiation field; computer means for determining the identity of the radiation field mixture by using a correlation between two ratios of the responses of two pairs of the TL element and for determining dose equivalent using the identity of the radiation field mixture.

4. A method as set forth in claim 1, wherein said three TL elements include a first filtered TL element used as a basis for deep dose estimation, a second filtered TL element used as a basis for photon energy determination, and a third filtered TL element used as a basis for shallow dose estimation, and wherein said two ratios include a first ratio of the response of the third filtered TL element to the response of the second filtered TL element and a second ratio of the response of the third filtered TL element to the response of the first TL element.

5. A method as set forth in claim 4, including the steps of representing said second ratio as a function of said first ratio and using said function to generate mixture identification curves used in step (c) to determine the identity of the radiation field mixture.

6. A method as set forth in claim 5, wherein steps (c) and (d) are performed automatically by a programmed computer means.

7. A method as set forth in claim 1, wherein the TL elements are nearly tissue equivalent TL elements.

8. A method as set forth in claim 7, wherein nearly tissue equivalent filters are used to filter TL elements.

9. A method as set forth in claim 8, wherein the TL elements are Lithium-based thermoluminescent elements.

10. A method as set forth in claim 9, wherein one of the three TL element is substantially thinner than the other two TL elements and is used as a basis for shallow dose estimation.

11. A system as set forth in claim 3, wherein the three TL elements include a first filtered TL element used as a basis for deep dose estimation, a second filtered TL element used as a basis for photon energy determination, and a third filtered TL element used as a basis for shallow dose estimation, and wherein said two ratios include a first ratio of the response of the third filtered TL element to the response of the second filtered TL element and a second ratio of the response of the third filtered TL element to the response of the first TL element.

12. A system as set forth in claim 11, wherein the second function is represented as a function of said first ratio, and said first computer means includes means for determining the identity of the radiation field mixture by using mixture identification curves generated by said function.

13. A system as set forth in claim 3, wherein the TL elements are nearly tissue equivalent TL elements.

14. A system as set forth in claim 13, wherein nearly tissue equivalent filters are used to filter the TL elements.

15. A system as set forth in claim 14, wherein the TL elements are Lithium-based thermoluminescent elements.

16. A system as set forth in claim 15, wherein one of the three TL elements is substantially thinner than the other two TL elements and is used as a basis for shallow dose estimation.

17. A calibration method comprising the steps of
(a) dividing a population of dosimeters into calibration dosimeters and field dosimeters;
(b) producing element correction coefficients for the calibration dosimeters;
(c) producing element correction coefficients for the field dosimeters based on a number of the calibration dosimeters;
(d) using a number of the calibration dosimeters to relate the response of the calibration dosimeters to a remote calibration source to their response to a local uncalibrated reference source;
(e) routinely using the local uncalibrated reference source and a number of the calibration dosimeters to maintain a known relationship between TL response reported by a dosimeter reader and the local uncalibrated reference source; and
(f) using the dosimeter reader to read out the TL response of the field dosimeters.

18. A method as set forth in claim 17, wherein step (d) includes reading in the dosimeter reader a number of the calibration dosimeters, which have been irradiated by the remote calibration source with a known radiation quantity, to relate the TL response reported by the dosimeter reader to the known radiation quantity.

19. A method as set forth in claim 18, wherein the known radiation quantity is defined in terms of risk related quantity.

20. A method as set forth in claim 17, wherein the local uncalibrated reference source is defined by a local stable source of radiation and a reproducible irradiation and readout procedure.

21. A personnel dosimetry method comprising the steps of:
(a) using a dosimeter to monitor exposure of a person to a mixed radiation field, the dosimeter including at least three TL elements filtered to respond differently to the mixed radiation field, said three TL elements including a first filtered TL element used as a basis for deep dose estimation, a second filtered TL element used as a basis for photon energy determination, and a third filtered TL element used as a basis for shallow dose estimation;
(b) reading out the TL response of the dosimeter to absorbed radiation;
(c) using a correlation between two ratios of the responses of two pairs of the TL elements to determine the identity of the radiation field mixture, said two ratios including a first ratio of the response of the third filtered TL element to the response of the second filtered TL element and a second ratio of the response of the third filtered TL element to the response of the first TL element; and
(d) using the identity of the radiation field mixture to determine dose equivalent; and
wherein said second ratio is represented as a function of said first ratio, said function is used to generate mixture identification curves used in step (c) to determine the identity of the radiation field mixture, and said function is in the form:

$$f(x) = [b_3 a_2 - a_3 b_2] x / [(b_1 a_2 - a_1 b_2) x + (a_1 b_3 - b_1 a_3)]$$

where "x" is said first ratio, and $a_i$ and $b_i$ are the TL responses of element i to the respective pure fields of the components "a" and "b" making up the mixture.

22. A personnel dosimetry system comprising: means for reading out the TL response of a dosimeter to radiation absorbed from a mixed radiation field, the dosimeter including three TL elements that were filtered to respond differently to the mixed radiation field, the three TL elements including a first TL element used as a basis for deep dose estimation, a second filtered TL element used as a basis for photon energy determination, and a third filtered TL element used as a basis for shallow dose estimation; computer means for determining the identity of the radiation field mixture by using a correlation between two ratios of the response of two pairs of the TL elements and for determining dose equivalent using the identity of the radiation field mixture, said two ratios including a first ratio of the response of the third filtered TL element to the response of the second filtered TL element and a second ratio of the response of the third filtered TL element to the response of the first TL element; and wherein the second ratio is represented as a function of said first ratio, said computer means includes means for determining the identity of the radiation field mixture by using mixture identification curves generated by said function, and said function is in the form:

$$f(x) = [b_3 a_2 - a_3 b_2] x / [(b_1 a_2 - a_1 b_2) x + (a_1 b_3 - b_1 a_3)]$$

where "x" is said first ratio, and "$a_i$" and "$b_i$" are the TL responses of element i to the respective pure fields of the components "a" and "b" making up the mixture.

* * * * *